US009210360B2

(12) United States Patent
Mountain

(10) Patent No.: US 9,210,360 B2
(45) Date of Patent: Dec. 8, 2015

(54) VOLUME LEVEL-BASED CLOSED-CAPTIONING CONTROL

(71) Applicant: Eldon Technology Limited, Steeton, Keighley (GB)

(72) Inventor: Dale Llewelyn Mountain, Keighley (GB)

(73) Assignee: EchoStar UK Holdings Limited, Steeton (GB)

( * ) Notice: Subject to any disclaimer, the term of this patent is extended or adjusted under 35 U.S.C. 154(b) by 280 days.

(21) Appl. No.: 13/730,145

(22) Filed: Dec. 28, 2012

(65) Prior Publication Data

US 2014/0184905 A1 Jul. 3, 2014

(51) Int. Cl.
*H04R 1/02* (2006.01)
*H04N 5/445* (2011.01)
*H04N 5/60* (2006.01)
*H04N 7/088* (2006.01)
*H04N 21/488* (2011.01)
*H04N 21/422* (2011.01)
*H04N 21/439* (2011.01)

(52) U.S. Cl.
CPC ............ *H04N 5/44582* (2013.01); *H04N 5/60* (2013.01); *H04N 7/0882* (2013.01); *H04N 21/42203* (2013.01); *H04N 21/4394* (2013.01); *H04N 21/4884* (2013.01)

(58) Field of Classification Search
CPC ............................... H04R 5/02; H04R 2499/15
USPC .......................................................... 381/333
See application file for complete search history.

(56) References Cited

U.S. PATENT DOCUMENTS

| 7,720,238 | B2 | 5/2010 | Tomita |
| 8,135,147 | B2 | 3/2012 | Hong |
| 2002/0124249 | A1 | 9/2002 | Shintani et al. |
| 2004/0252979 | A1 | 12/2004 | Momosaki et al. |
| 2005/0038661 | A1* | 2/2005 | Momosaki et al. ........... 704/275 |
| 2006/0044479 | A1 | 3/2006 | Heo |
| 2006/0221257 | A1 | 10/2006 | Nakayama |
| 2012/0180093 | A1 | 7/2012 | Ishihara et al. |

FOREIGN PATENT DOCUMENTS

| EP | 1 681 765 A2 | 7/2006 |
| EP | 1 816 860 A1 | 8/2007 |
| EP | 1 519 624 B1 | 2/2009 |
| JP | 2010-50554 A | 3/2010 |

(Continued)

*Primary Examiner* — Simon King
(74) *Attorney, Agent, or Firm* — Seed IP Law Group PLLC

(57) ABSTRACT

Methods and apparatus are provided for a control of closed captioning based on an audio volume level. A content receiver detects that a volume of an audio of a video presentation has been adjusted by a user, and determines the adjusted audio volume level that results from the adjustment. The content receiver compares the resulting adjusted audio volume level to a threshold level. When the content determines that the adjusted audio volume level is under the threshold level, it enables closed captioning of the video presentation, thus presenting the user with both audio and closed captioning. When the content receiver determines that the adjusted audio volume level is above the threshold level, it disables closed captioning for the video presentation. The content receiver may use a microphone to determine the adjusted audio volume level.

20 Claims, 5 Drawing Sheets

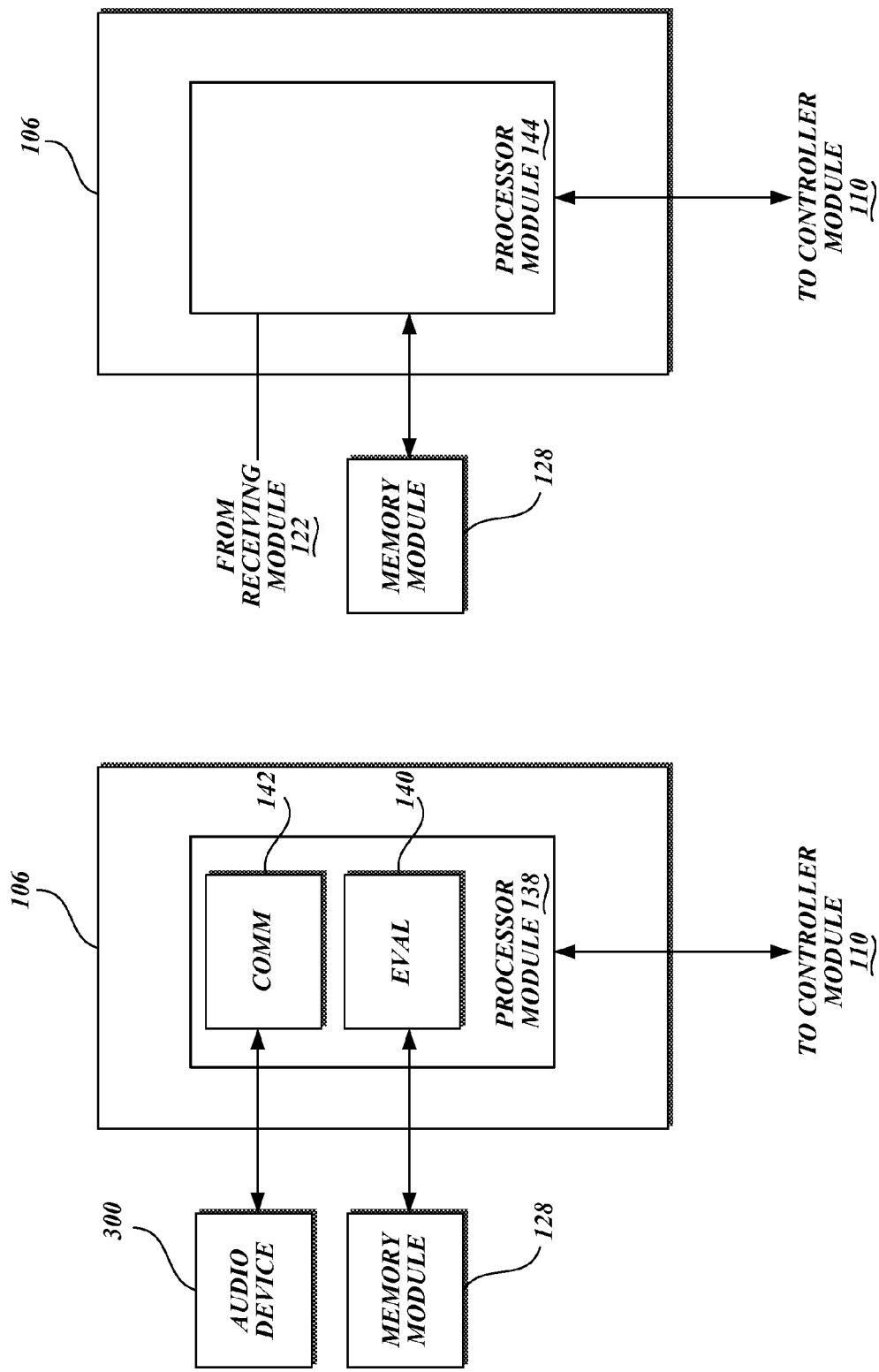

VOLUME LEVEL-BASED CLOSED-CAPTIONING CONTROL

BACKGROUND

1. Technical Field

The present disclosure relates to a control of closed captioning in video presentations. In particular, the present invention relates to the control of closed captioning in a video presentation based on the volume level of its audio.

2. Description of the Related Art

Captioning, or subtitling as it is known in Europe, is a well-known process of displaying a transcription of the audio portion of a program on a display device. The transcription generally appears as the audio is output and sometimes includes non-speech elements. Captioning may be open or closed; open caption is always in view, while closed caption can be turned on or off. In some countries, the US being one of them, television receivers are required to include Closed Captioning (CC) display capability. Not all programming contains CC information, however, and in this case, no transcription would appear even if CC is enabled.

Television receivers, such as television sets, set top boxes, and cable boxes, generally allow a user to enable or disable CC through a special system configuration setting, such as a setup or preference menu. The size and color of the text, as well as the color of the caption background, can generally be selected through the same menu. Once CC is enabled through the special system configuration setting, each programming content with available CC is shown with captions when displayed through the device. However, a user is usually not allowed to change the status of the CC in the middle of the presentation; the user usually has to leave the video presentation and return to the system configuration setting to change the status of the CC.

It is desirable, to simplify and improve user experience, to have a television receiver in which a status of CC can be changed without reconfiguring the television receiver.

BRIEF SUMMARY

Various embodiments are provided for a content receiver that controls CC when it detects that a user has made volume level adjustments while the user is watching a video presentation on a display device and listening to the audio associated with the video presentation. In these various embodiments, the content receiver enables CC when it detects that the user has lowered the volume level of the audio to below a selected threshold level, thus the content receiver encodes the caption with the video data before transmitting the video presentation to the display device. The content receiver disables CC when it detects that the user has raised the volume level of the audio to a level higher than the selected threshold level, thus it removes the caption before transmitting the video presentation to the display device.

In a first embodiment, the content receiver includes a microphone and uses it to detect new audio volume level and to determine the measure, or value, of the audio volume level. The content receiver uses this measured volume level to determine whether to enable or disable CC in the video presentation.

In a second embodiment, a user controls the audio volume level by communicating with the audio device using a remote control. The audio device communicates audio adjustment information via messages to the content receiver over an audio interface. Using the information from the received messages and a last known volume level, the content receiver determines the adjusted volume level, compares it to the selected threshold value, and enables or disables CC based on this comparison.

In a third embodiment, the content receiver uses the transmission from the remote control to detect an audio volume level adjustment. When the content receiver detects a transmission indicating a volume adjustment, it uses the information included in the transmission to determine the adjusted volume level.

BRIEF DESCRIPTION OF THE SEVERAL VIEWS OF THE DRAWINGS

FIG. 4B shows a block diagram of a second embodiment of the volume detection module in a content receiver.

FIG. 4C shows a block diagram of a third embodiment of the volume detection module in a content receiver.

DETAILED DESCRIPTION

Figure 1:
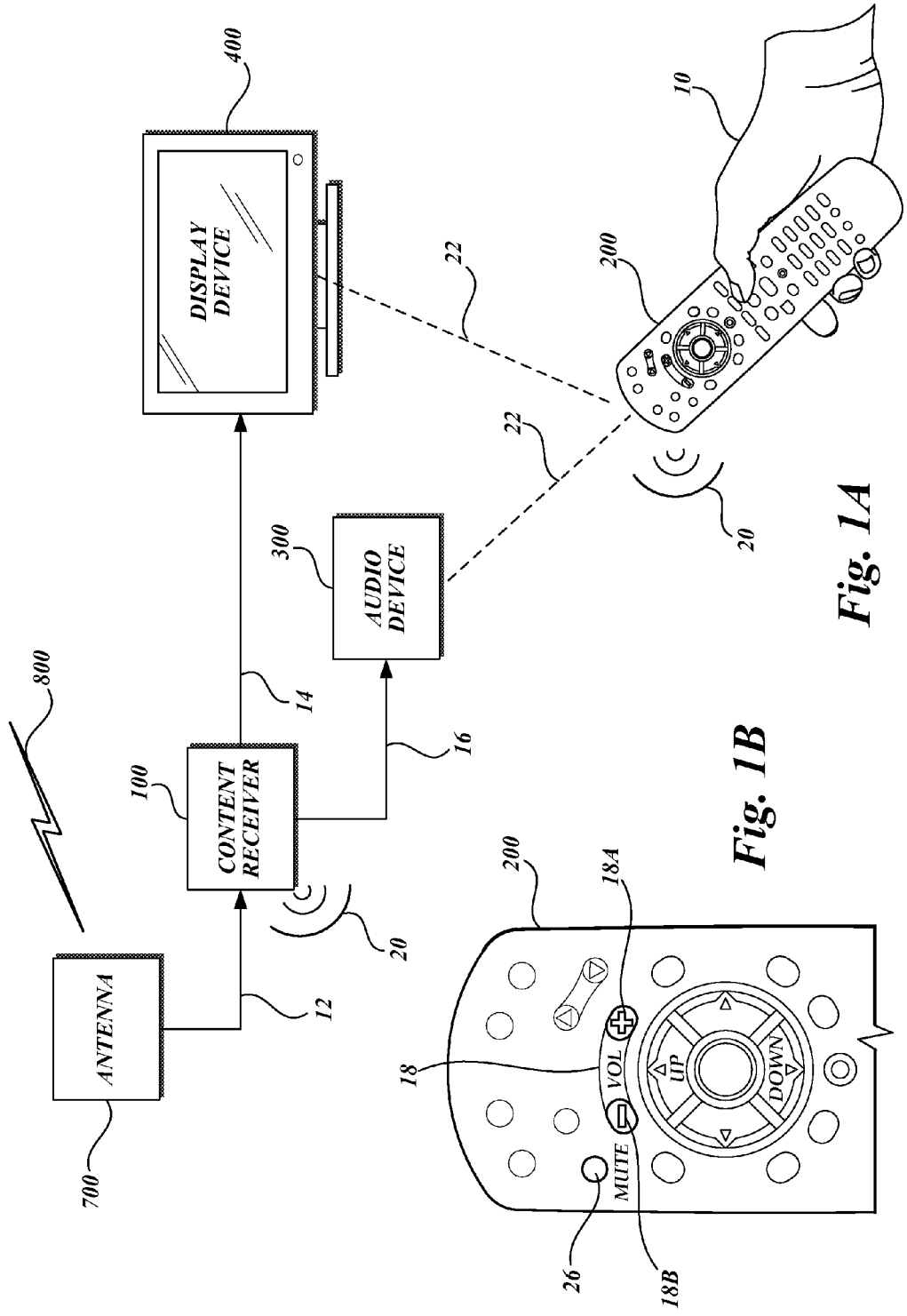
FIG. 1A shows an exemplary system that includes a content receiver according to an embodiment of the invention.
FIG. 1B shows a close-up view of an exemplary remote control.

In the following description, certain specific details are set forth in order to provide a thorough understanding of various embodiments of the disclosure. However, one skilled in the art will understand that the disclosure may be practiced without these specific details. In some instances, well-known interfaces have not been described in detail to avoid obscuring the description of the embodiments of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

Referring initially to FIG. 1A, a exemplary entertainment system that includes an embodiment of the present invention is shown to assist in the understanding of its operation. Such exemplary environment includes a content receiver 100, a display device 400, an audio device 300 that drives audio speakers (not shown), and a remote control 200. Some display devices have the capability to output audio, in which case the display device 400 also functions as the audio device 300. A user 10 communicates with the content receiver 100 using the remote control 200. In this exemplary environment, the user 10 uses the remote control 200 to also communicate with the display device 400 and the audio device 300. In other environments, the user 10 may use a different remote control to communicate with the display device 400, and another different remote control to communicate with the audio device 300. As illustrated in FIG. 1B, remote control 200 includes volume adjustment buttons 18. User 10 uses the VOL+ button 18A or VOL− button 18B on the remote control 200 to respectively increase and decrease the audio volume output by the audio device 300. Remote control 200 also includes a MUTE button 26, and actuation of the MUTE button 26 turns the audio volume output by audio device 300 ON or OFF. As used in this disclosure, the MUTE button 26 is NOT a volume adjustment button, and any detection of volume adjustment does not include detection of an actuation of the MUTE button 26.

The content receiver 100 receives an encrypted signal that carries programming contents from antenna 700 via first cable 12, the encrypted signal being a down-converted version of the signal 800 received by the antenna. In a satellite television system, signal 800 is sourced by a satellite broadcast provider. Antenna 700 may be a satellite antenna receiving microwaves from communication satellites, or a terrestrial antenna receiving radio waves from alternative broadcast providers. It is also contemplated that content receiver 100 receives programming content over other communication networks, such as the internet.

Content receiver 100 is coupled to the antenna 700 over first cable 12, to the display device 400 over second cable 14 and to the audio device 300 over third cable 16. Second cable 14 carries video signal. In a preferred embodiment, second cable 14 is an analog video cable carrying an analog video signal. Examples of analog video cable are composite video, component video and SCART cables. It is, however, also contemplated that second cable 14 is an HDMI cable or other type of cable system suitable to carry digital a video signal. Third cable 16 is preferably an HDMI cable, but it may also be another type of cable suitable to carry audio signal.

In a preferred embodiment, audio device 300 is integrated with display device 400, and in this embodiment, second cable 14 carries both video and audio signals. Second cable 14 for this embodiment is preferably an HDMI cable, but other cables capable of carrying both video and audio signals may be used.

Remote control 200 communicates with content receiver 100 over a first wireless link 20. In a preferred embodiment, first wireless link 20 is a radio frequency link, such as ZigBee, Wi-Fi, or Bluetooth. First wireless link 20 may also be an optical link, such as infrared. Remote control 200 communicates with audio device 300 over second wireless link 22, preferably an infrared link. Other wireless communication links, such as a radio frequency link, are contemplated for second wireless link 22. To control the content receiver 100, the remote control 200 must be in a SAT mode (Satellite Mode). The user 10 places the remote control 200 in SAT mode by pressing the SAT button (not shown) on the remote control 200. To control display device 400 and audio device 300, the user places the remote control 200 in the appropriate modes by pressing the TV button and AUX button, respectively, on the remote control 200. If the audio device 300 is integrated into the display device 400, a remote control 200 in TV mode controls the functionalities of both the display device and the audio device.

Once the user 10 selects a programming content to watch, the content receiver 100 sends the video data of the programming content to the display device 400, and the audio data to the audio device 300. The user 10 watches the video presentation on the display device 400 and listens to the audio at a first volume level. To have a better viewing experience, user 10 may want to listen to louder audio, and turns up the volume level of the audio using the VOL+ button 18A on remote control 200. In the event that the user 10 has to momentarily lower the audio volume level, for example to accommodate phone conversation in the background or another viewer's sensitivity to sound, but does not want to mute the audio and miss anything happening in the viewed programming content, user 10 uses the VOL− button 18B to lower the volume level, maybe actuating the VOL− button 18B several times, and at a certain volume level, closed captioning of the video presentation becomes enabled. The content receiver 100 detects volume adjustments and compares the adjusted volume level to a threshold level. When the content receiver determines that the adjusted volume level is less than the threshold level, it enables closed captioning of the video presentation. This allows user 10 to simultaneously experience audible audio and closed captioning of the video presentation. Once there is no longer a need for the lowered volume, and user 10 wishes to return to the higher volume level, the user 10 actuates the VOL+ button 18A to bring up the audio volume output by audio device 300. When the content receiver 100 detects a volume adjustment, it compares the adjusted volume level to the threshold level. When the adjusted volume level is higher than the threshold level, content receiver 100 disables closed captioning of the video presentation. In a preferred embodiment, the threshold level used for comparison is a level selected by the user. The content receiver 100 may also determine an appropriate threshold level.

Figure 2:
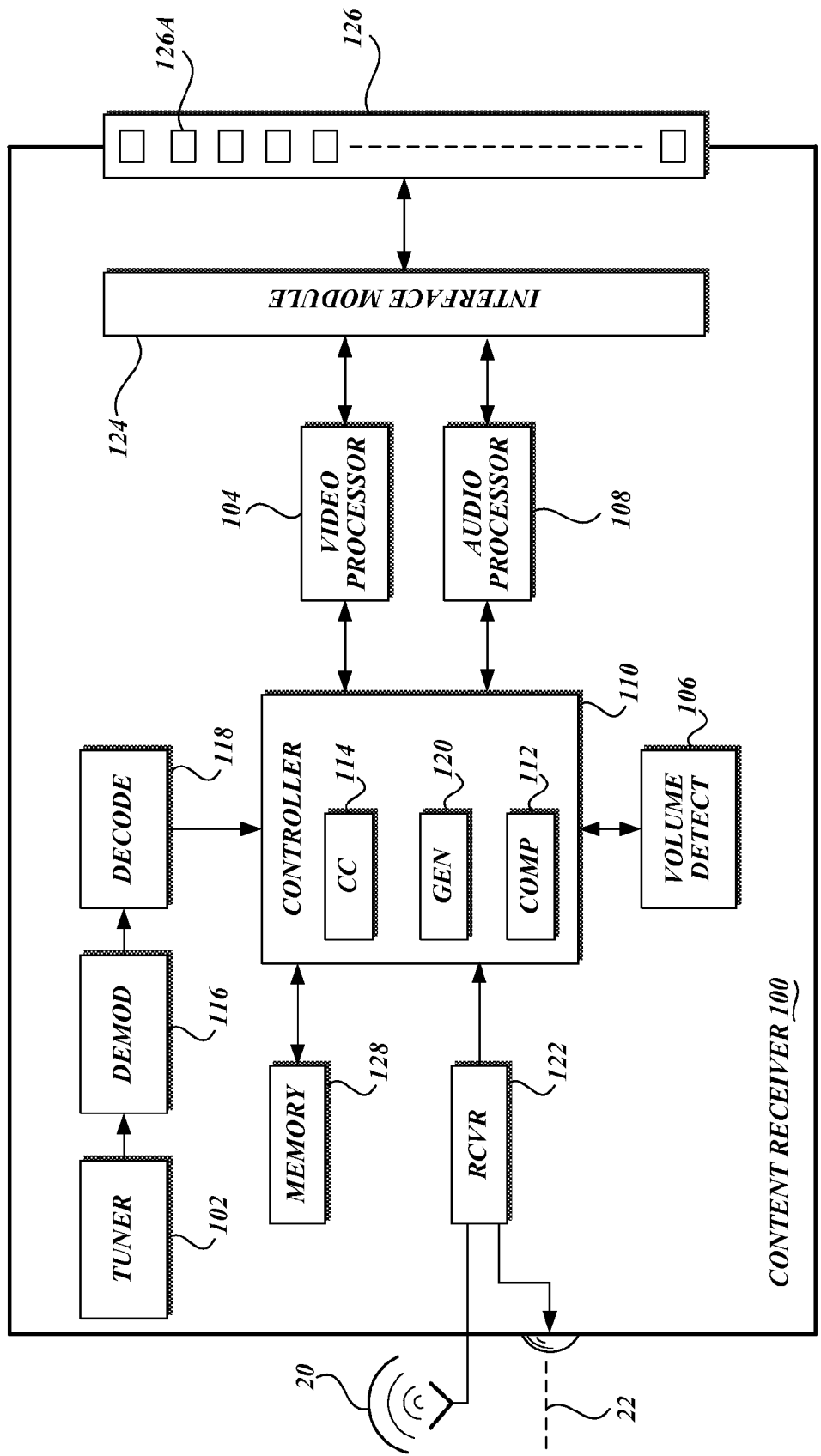
FIG. 2 shows a block diagram of an exemplary content receiver.

A configuration of the content receiver 100 will now be described. As illustrated in FIG. 2, the content receiver 100 includes a tuning module 102, a demodulating module 116, a decoding module 118, a video processing module 104, an audio processing module 108, a controlling module 110, a volume detecting module 106, a receiving module 122, and an interface module 124. Each module or functionality described herein may be implemented as a hardware, software, firmware of a combination thereof. Modules and functionalities described herein may be combined or further separated into their components.

The receiving module 122 is configured to receive wireless communications. In a preferred embodiment, the receiving module 122 receives both a radio frequency communication and an infrared communication. In another embodiment, the receiving module 122 receives radio frequency communication only. It is possible that the receiving module 122 is able to receive a combination of two or more wireless communications of the same or different types.

The tuning module 102 is configured to receive and tune to a digital broadcast signal in digital satellite broadcasting, terrestrial digital broadcasting, or the like. The digital broadcast signal is subsequently demodulated by the demodulating module 116 and decoded by the decoding module 118. The decoding module is configured to extract the video and audio data of a selected programming content along with its caption data. The caption data is used for closed captioning its associated video when closed captioning is enabled. The decoding module forwards the extracted video, audio and caption data to the controlling module 110. Video data may also be directly sent to the video processing module 104 and audio data may be directly sent to the audio processing module 108.

The controlling module 110 includes a comparing module 112, a control generating module 120, and a closed captioning module 114. The closed captioning module 114 processes the caption data for use in closed captioning. When closed captioning is enabled, the closed captioning module 114 works with the video processing module 104 to encode the caption data with the video data for closed captioning of the video presentation. The comparing module 112 receives a volume level value from the volume detection module 106 and compares it with a threshold level retrieved from memory module 128. The comparing module 112 sends the result of the comparison to the control generating module 120 that is configured to enable or disable closed captioning based on the result of the comparison. The control generating module 120 may generate a signal or set a bit in a register to indicate enablement or disablement of closed captioning. Other means to indicate control of closed captioning are also contemplated. The control or indication is made available for use by the closed captioning module 112.

The memory module 128 is coupled to the controlling module 110 and includes volatile and non-volatile memory. The memory module 128 stores instructions for the controlling module 110 and data to be used when the instructions are executed. SRAM and DRAMS may be used for volatile memory, and NVRAM, such as FLASH, FRAM and MRAM, may be used as non-volatile memory. Other volatile and non volatile memories are also contemplated for inclusion in the memory module 128.

The interface module 124 configures signals coupled to a connector bank 126. The interface modules 124 may format outgoing signals appropriately for their intended receiving devices, and incoming signals for the content receiver 100. The formatting may include modifying signal levels, converting an analog signal to a digital signal or vice versa, and encoding a signal to an established transmission standard. The connector bank 126 includes a plurality of connectors for coupling to other electronic devices over a plurality of communication systems. In a preferred embodiment, the connector bank 126 includes an audio connector 126A configured to carry audio from the content receiver to the audio device 300, and to support bidirectional communication between the content receiver 100 and the audio device 300. The audio connector 126A may also be configured to carry video signal. One example of such connector is an HDMI connector with the bidirectional communication being carried out through the CEO. The connector bank 126 may also include a connector for optical communication of audio signal, a video connector for analog video transmission, and a connector for analog audio transmission.

The audio processing module 108 processes the audio data before it is sent out to the audio device 300. In a preferred embodiment, the audio processing module 108 converts a digital audio data into an analog audio signal corresponding to a designated decibel value. In a further embodiment, the audio processing module 108 generates a digital audio signal corresponding to the designated decibel value. The audio processing module 108 forwards the processed audio to the interface module 124.

Figure 3:
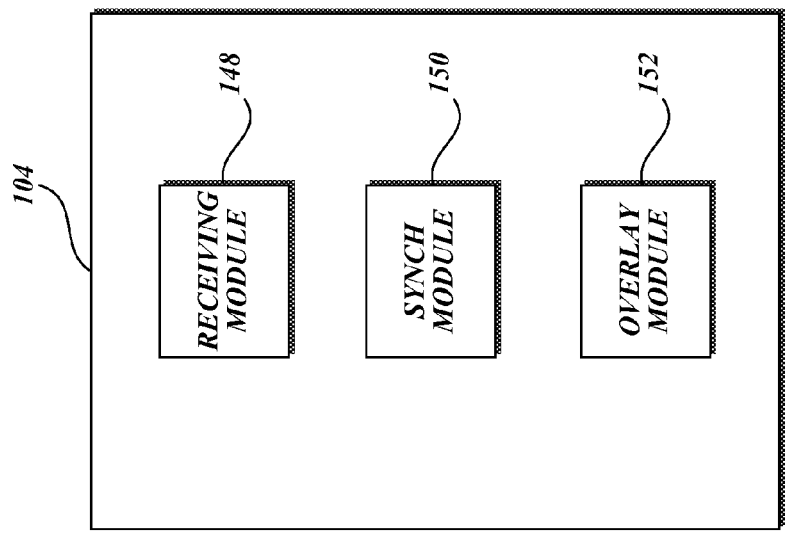
FIG. 3 shows a block diagram of an exemplary controlling module in a content receiver.

The video processing module 104 is configured to process the video data and to encode caption data together with the video data before forwarding the video signal to the interface module 124. A schematic of the video processing module 104 is illustrated in FIG. 3. The video processing module includes a receiving module 148 configured to receive video data and caption data from the controlling module 110. Instead of receiving the video data from the controlling module 110, the video processing module 104 may receive video data from the decoding module 118. A synchronization module 150 in the video processing module synchronize the text of the caption data over the video presentation with the audio associated with the video presentation before it is overlaid on the video presentation in the overlay module 152. When closed captioning is enabled, the video signal output by the video processing module 104 includes caption data renderable as text on the video presentation, presented synchronously with the audio associated with the video presentation.

A volume detecting module 106 is configured to detect volume adjustment and determine an updated volume level resulting from the detected volume adjustment. A first embodiment of the volume detecting module 106 is illustrated in FIG. 4A.

Figure 4A:
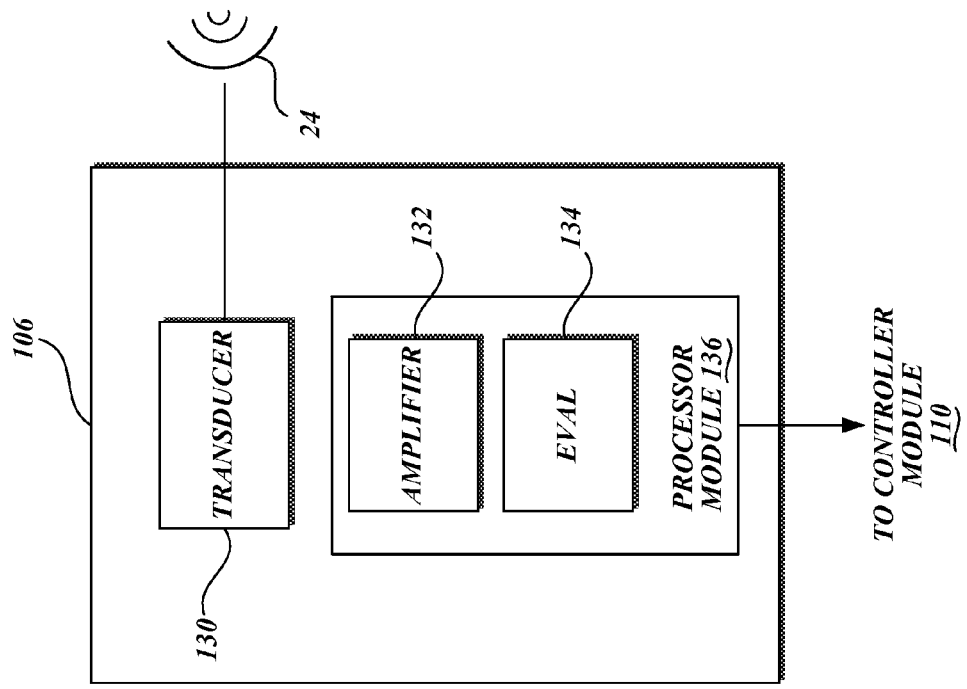
FIG. 4A shows a block diagram of a first embodiment of the volume detection module in a content receiver.

The volume detecting module 106 as illustrated in FIG. 4A includes a transducer 130, an amplifier module 132, and an evaluating module 134. The amplifier module 132 and the evaluating module 134 may be parts of a processing module 136 package. Sound pressure or acoustic pressure is the local pressure deviation from the ambient atmospheric pressure caused by a sound wave. A transducer is used to convert such acoustic information to an electrical signal such as voltage, current or electric power. In this embodiment, the transducer 130, such as a microphone, detects an acoustic air pressure 24 and converts it to a voltage level. The detected acoustic air pressure 24 represents a volume level of the audio. The amplifier module 132 amplifies the electrical signal and the evaluating module 134 determines the "value" of the volume level—the objective measure of a volume level.

Loudness is a subjective measure of an audio signal, and is distinguished from an objective measure of a sound signal such as sound pressure, sound intensity or sound power. To determine the value of the "volume" of an audio signal, let's agree on how it is measured. In its electrical form, the audio signal can be described by the amount of voltage or current, or by the energy contained within the signal. There are many ways to measure the level of loudness or volume level, such as Vpp (Peak to Peak) and Vrms. There are also at least a couple of measurement units to represent their values: VU (Volume Unit), preferred for measuring the level of complex, nonrecurring, and nonperiodic signals such as music and speech, and dB (decibels), preferred for steady-state waves. The VU and the decibel meters are very different units and must be treated as such. Either VU or decibel may be used as the measurement unit in the preferred embodiment, as long as each is consistently used in the embodiment. Other measures of the volume level designating its value may also be used. The volume detecting module 106 in the first embodiment outputs the adjusted volume level value to be used by the controlling module 110 in determining whether to enable or disable closed captioning of the video presentation.

A second embodiment of the volume detecting module 106 is illustrated in FIG. 4B. The volume detecting module 106 in FIG. 4B includes a communication module 142 and an evaluating module 140. The communication module 142 and the evaluating module 140 may be parts of a processing module 138 package. The communication module 142 is configured to communicate with the audio device 300 about the state of the audio functionality, including the audio volume adjustment. The communication module 142 may query the audio device 300 to send it audio status messages and any input from the user 10 that impacts the audio volume level. The query and response may be implemented as CEO commands. For example, during a volume adjustment operation, when the user 10 actuates the VOL+ button 18A or VOL− button 18B on the remote control 200, the audio device 300 acquires volume adjustment information corresponding to the operation and sends the volume adjustment information in a message to the communication module 142. The communication module 142 extracts the volume adjustment information from the message and forwards it to the evaluating module 140. The evaluating module 140 uses the volume adjustment information to determine the adjusted volume level value. In one aspect of the embodiment, the adjusted volume level value is stored in the memory module each time it is determined by the evaluating module 140, and the stored adjusted volume level value is defined as "the last known volume level value." In another aspect of the embodiment, the volume adjustment information may include an incremental volume change indication. The evaluating module 140 may use the last known volume level value with the incremental volume change indication in its determination of the adjusted volume level value. The adjusted volume level value may be determined in VU, decibels or other appropriate measuring units. The evaluating module 140 sends the updated volume level value to the controlling module 110.

A third embodiment of the volume detecting module 106 is illustrated in FIG. 4C. In this embodiment, the receiving module 122 of the content receiver is configured to receive transmissions of commands for volume adjustments from remote control 200. A volume adjustment transmission carries volume adjustment information that may include an adjusted volume level or an incremental volume change indication. The volume detecting module 106 includes a processing module 144 configured to determine the value of the adjusted volume level from the volume adjustment information included in the transmission. In an aspect of the embodiment, the determined adjusted volume level value is stored in the memory module 128 as the "last known volume level value." The processing module 144 may use the last known volume level value together with an incremental volume change indication included in the transmission to determine the adjusted volume level value. The adjusted volume level value may be determined in VU, decibels or other appropriate measuring units. The processing module 144 forwards the determined adjusted volume level value to the controlling module 110.

Figure 5:
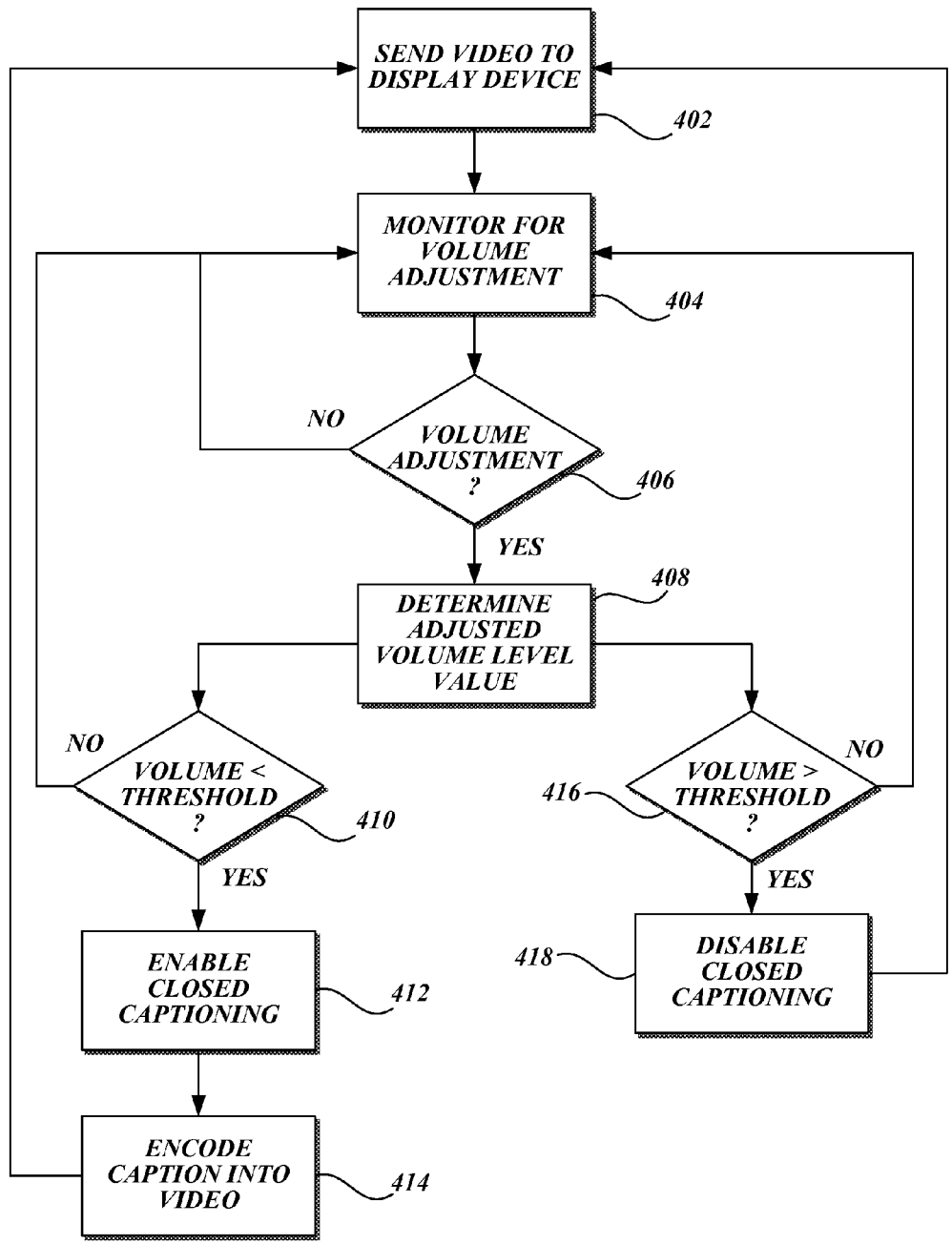
FIG. 5 shows a flow chart explaining a dynamic controlling of close captioning according to one embodiment of the invention.

Turning now to FIG. 5, an illustrative dynamic control of closed captioning in a content receiver 100 begins with the content receiver 100 sending a video signal for presentation on a display device 400 (step 402). The content receiver 100 also sends an audio signal associated with the video to an audio device 300. The audio device 300 may be integrated in the display device 400. Next, the content receiver 100 monitors for any changes in volume level (step 404). There are several embodiments with which the content receiver 100 may monitor changes in volume level, such as by using a transducer, by exchanging messages with the audio device, and by receiving volume adjustment transmissions from the remote control 200 (step 406). Once the content receiver 100 detects a volume adjustment, the content receiver 100 determines the new, adjusted volume level value (step 408). The adjusted volume level value is compared to a selected threshold value, and if it is less than the selected threshold value (step 410), then CC is enabled (step 412). If the updated volume level value is more than the selected threshold value (step 416), then CC is disabled (step 418). When CC is enabled, the content receiver 100 encodes caption data with the video data (step 414) before sending the video data to the display device 400 (step 402.)

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
sending from a content receiver, a video signal to a display device, the video signal carrying a video data for a video presentation on the display device;
sending from the content receiver, an audio signal to an audio device, the audio signal carrying an audio data for output as an audio at a first volume level value, the audio data being associated with the video data;
detecting, by the content receiver, a volume adjustment that alters the audio output by the audio device;
determining, at the content receiver, a second volume level value based at least on the detected volume adjustment; and
in response to the volume adjustment, modifying, under control of the content receiver, a state of closed-captioning in the video presentation based on the determined second volume level value.

2. The method as claimed in claim 1, wherein determining the second volume level value comprises:
determining a last known volume level value;
receiving from the audio device, an audio control message associated with the volume adjustment; and
determining the second volume level value based at least on the last known volume level value and the audio control message.

3. The method as claimed in claim 1 wherein the modifying, under control of the content receiver, the state of closed-captioning in the video presentation comprises:
providing text on the video presentation when the second volume level value is below a selected threshold value, the text being at least a transcription of the audio associated with the video presentation.

4. The method as claimed in claim 1 further comprising:
receiving, at the content receiver, an input from a user selecting the selected threshold value; and
storing the selected threshold value in the memory module.

5. The method as claimed in claim 1 wherein the audio device is integrated with the display device.

6. The method as claimed in claim 1 further comprising:
storing the second volume level value as a last known volume level value in a memory module.

7. A method comprising:
sending from a content receiver, a video signal to a display device, the video signal carrying video data for a video presentation on the display device;
sending from the content receiver, an audio signal to an audio device, the audio signal carrying an audio data for output as an audio at a first volume level, the audio data being associated with the video data;
detecting, by the content receiver, a volume adjustment that has occurred associated with the audio output by the audio device;
determining, at the content receiver, a second volume level value based at least on the detected volume adjustment, by
receiving, at a transducer, an acoustic air pressure resulting from the volume adjustment, the acoustic air pressure being associated with a the audio output by the audio device;

converting the acoustic air pressure to an electrical signal; and
outputting the electrical signal as the second volume level value; and
modifying, under control of the content receiver, a state of closed-captioning in the video presentation based on the determined second volume level value.

8. A method comprising:
sending from a content receiver, a video signal to a display device, the video signal carrying video data for a video presentation on the display device;
sending from the content receiver, an audio signal to an audio device, the audio signal carrying audio data for output as an audio at a first volume level, the audio data being associated with the video data;
detecting, by the content receiver, a volume adjustment that has occurred associated with the audio output by the audio device;
determining, at the content receiver, a second volume level value based at least on the detected volume adjustment; by
determining a last known volume level value;
receiving, at the content receiver, a transmission of the volume adjustment from a remote control; and
determining the second volume level value based at least on the last known volume level value and the received transmission of the volume adjustment and
modifying, under control of the content receiver, a state of closed-captioning in the video presentation based on the determined second volume level value.

9. A method comprising:
sending from a content receiver, a video signal to a display device, the video signal carrying video data for a video presentation on the display device;
sending from the content receiver, an audio signal to an audio device, the audio signal carrying audio data for output as an audio at a first volume level, the audio data being associated with the video data;
detecting, by the content receiver, a volume adjustment that has occurred associated with the audio output by the audio device;
determining, at the content receiver, a second volume level value based at least on the detected volume adjustment; and
modifying, tinder control of the content receiver, a state of closed-captioning in the video presentation based on the determined second volume level value, by
retrieving from a memory module, a selected threshold value;
enabling closed-captioning of the video presentation if the second volume level value is less than the selected threshold value; and
disabling the closed-captioning of the video presentation if the second volume level value is more than the selected threshold value.

10. A content receiver comprising:
a tuning module configured to receive an encrypted signal;
a decoding module coupled to the tuning module, the decoding module configured to decode a programming content and caption data from the encrypted signal, the programming content including video data and audio data associated with the video data, the caption data being associated with the video data and the audio data;
a receiving module configured to receive a transmission from a remote control;
a video processing module configured to process the video data for display as a video presentation;
an audio processing module configured to process the audio data for output as an audio;
an interface module configured to send the audio data to an audio device for output at a first volume level and to send the video data to a display device for display as a video presentation;
a controlling module coupled to the receiving module, the video processing module, and the audio processing module, the controlling module including
a comparing module configured to compare a second volume level value to a selected threshold value, and
a control generating module configured to control closed-captioning of the video presentation; and
a volume detection module coupled to the controlling module, the volume detection module configured to determine the second volume level value in response to a volume level adjustment to the first volume level.

11. The content receiver as claimed in claim 10 wherein the video processing module comprises:
a receiving module configured to receive the caption data and the video data;
a synchronization module configured to synchronize the caption data to the video data; and
an overlay module configured to encode, in a synchronized manner, the caption data onto the video data, the caption data for display as a text on the video presentation.

12. The content receiver as claimed in claim 10 wherein the volume detection module comprises:
a transducer configured to
detect an acoustic air pressure associated with the volume level adjustment, and
convert the acoustic air pressure into an electrical signal; and
a processing module coupled to the transducer, the processing module configured to output the electrical signal as the second volume level value.

13. The content receiver as claimed in claim 10 wherein the volume detection module comprises:
a processing module coupled to the interface module, the processing module configured to
retrieve a last known volume level value from a memory module,
receive a message from the audio device via a first connector coupled to the interface module, the message being associated with the volume level adjustment, and
determine the second volume level value based at least on the last known volume level value and the received message.

14. The content receiver as claimed in claim 10 wherein the transmission from the remote control is a volume adjustment command, and wherein the volume detection module comprises:
a processing module coupled to the receiving module, the processing module configured to
retrieve a last known volume level value from a memory module, and
determine the second volume level value based at least on the last known volume level value and the volume adjustment command.

15. The content receiver as claimed in claim 10 wherein the controlling module is configured to
retrieve the selected threshold value from a memory module,
compare the second volume level value to the selected threshold value, enable closed-captioning of the video presentation if the second volume level value is less than the selected threshold value, and disable the closed-captioning of the video presentation if the second volume level value is greater than the selected threshold value.

16. The content receiver as claimed in claim 10 further comprising:
a memory module coupled to the controlling module and to the volume detection module, the memory module configured to store the selected threshold value and a last known volume level value.

17. A system comprising:
a display device;
an audio device configured to output an audio;
a remote control device configured to transmit an adjustment command to adjust volume of audio output by the audio device;
a content receiver coupled to the display device and the audio device, the content receiver configured to
receive an encrypted signal via a tuner, the encrypted signal including video, audio, and caption data,
decode the video, audio and caption data from the encrypted signal,
send the video data to the display device for output as a video presentation,
send the audio data to the audio device for output as the audio at a first volume level,
detect a volume adjustment to the audio,
determine a second volume level value based at least on the detected volume adjustment,
store the second volume level value in memory as a last known volume level value, and
modify closed captioning of the video presentation based at least on a comparison between the second volume level value and a selected threshold value, closed captioning being a display of text over the video presentation, the text being at least a transcription of the audio associated with the video presentation.

18. The system in claim 17 wherein the content receiver detects the volume adjustment to the audio by
receiving an acoustic air pressure resulting from the volume adjustment, the acoustic air pressure being associated with the audio,
converting the acoustic air pressure to an electrical signal, and
outputting the electrical signal as the second volume level value.

19. The system in claim 17 wherein the content receiver detects the volume adjustment to the audio by
retrieving the last known volume level value from the memory,
receiving, from the audio device, an audio control message associated with the volume adjustment, and
determining the second volume level value based at least on the last known volume level value and the audio control message.

20. The system in claim 17 wherein the content receiver detects the volume adjustment to the audio by
retrieving the last known volume level value from the memory,
receiving the volume adjustment command transmission from the remote control device, and
determining the second volume level value based at least on the last known volume level and the received volume adjustment command.

* * * * *

UNITED STATES PATENT AND TRADEMARK OFFICE
CERTIFICATE OF CORRECTION

| | | |
|---|---|---|
| PATENT NO. | : 9,210,360 B2 | Page 1 of 1 |
| APPLICATION NO. | : 13/730145 | |
| DATED | : December 8, 2015 | |
| INVENTOR(S) | : Dale Llewelyn Mountain | |

It is certified that error appears in the above-identified patent and that said Letters Patent is hereby corrected as shown below:

On the title page

Item (56) should read:
--JP 2012-70150 A 04/2012-- and --JP 2012-134931 A 07/2012--.

In the claims

Column 8, Lines 65-67:
"the acoustic air pressure being associated with a the audio output by the audio device;" should read, --the acoustic air pressure being associated with the audio output by the audio device;--.

Signed and Sealed this
Second Day of August, 2016

Michelle K. Lee
*Director of the United States Patent and Trademark Office*